US008167128B2

(12) United States Patent
McGinnis et al.

(10) Patent No.: US 8,167,128 B2
(45) Date of Patent: May 1, 2012

(54) CUPCAKE SECUREMENT DEVICE

(76) Inventors: Peggy A. McGinnis, Detroit, MI (US); Colleen M. Patrona, Clinton Township, MI (US); Robert J. McGinnis, St. Clair Shores, MI (US); Denise M. McGinnis, New Baltimore, MI (US); James D. McGinnis, New Baltimore, MI (US); Kimberly A. Fuga, Shelby Township, MI (US); Sally T. Palazzolo, Shelby Township, MI (US); Kim P. Fuga, Shelby Township, MI (US)

( * ) Notice: Subject to any disclaimer, the term of this patent is extended or adjusted under 35 U.S.C. 154(b) by 1053 days.

(21) Appl. No.: 10/867,254

(22) Filed: Jun. 14, 2004

(65) Prior Publication Data
US 2004/0251162 A1 Dec. 16, 2004

Related U.S. Application Data

(60) Provisional application No. 60/478,298, filed on Jun. 13, 2003.

(51) Int. Cl.
*B65D 83/38* (2006.01)
(52) U.S. Cl. ........................................ 206/551; 220/4.22
(58) Field of Classification Search .................. 206/485, 206/485.1, 551, 588, 591, 592; 220/4.21–4.25
See application file for complete search history.

(56) References Cited

U.S. PATENT DOCUMENTS

| | | | |
|---|---|---|---|
| 2,588,957 A * | 3/1952 | Brown | 312/200 |
| 2,614,727 A | 10/1952 | Robinson | |
| 2,685,316 A | 8/1954 | Krasno | |
| 2,687,157 A | 8/1954 | Cowan | |
| 2,729,375 A | 1/1956 | Pace | |
| 2,798,784 A * | 7/1957 | Marshall | 312/199 |
| 2,845,104 A | 7/1958 | Frankel | |
| 3,043,354 A | 7/1962 | Fitzgerald | |
| 3,483,908 A | 12/1969 | Donovan | |
| D218,155 S | 7/1970 | Britt | |
| 3,530,917 A | 9/1970 | Donovan | |
| 3,874,548 A | 4/1975 | Buff, Jr. | |
| 3,977,595 A | 8/1976 | Hillgenberg | |
| 4,013,214 A | 3/1977 | Hansen et al. | |
| 4,014,450 A | 3/1977 | Girotti et al. | |
| 4,096,986 A | 6/1978 | Florian | |
| 4,183,446 A | 1/1980 | Davis | |
| 4,193,531 A * | 3/1980 | Saby | 206/521.6 |
| 4,270,490 A | 6/1981 | Kopp | |
| 4,298,133 A | 11/1981 | Davis | |

(Continued)

OTHER PUBLICATIONS

Erik Ruhling, "Iron Maiden".*

*Primary Examiner* — J. Gregory Pickett
*Assistant Examiner* — Robert Poon
(74) *Attorney, Agent, or Firm* — Cargill & Associates, PLLC; Lynn E. Cargill

(57) ABSTRACT

An individual cupcake holder having prongs extending inwardly from the outside shell walls in order to secure a cupcake in place within the cupcake holder, either above the baking liner or anywhere below the lip edge of the cupcake baking liner so that the frosting of the cupcake remains unmarred during transport in lunch boxes and the like. It is also disclosed to include a plurality of prongs that secure a cupcake both above and through the baking liner. Of course, other pastries may be transported in this little container, as well as pieces of fruit and other assorted food items.

10 Claims, 3 Drawing Sheets

U.S. PATENT DOCUMENTS

| | | | |
|---|---|---|---|
| 4,375,262 A * | 3/1983 | Hrenyo | 206/418 |
| 4,383,638 A | 5/1983 | Bixler | |
| 4,753,366 A | 6/1988 | Ritter | |
| 4,787,552 A | 11/1988 | Natori | |
| 4,813,543 A | 3/1989 | Goldberg | |
| 4,915,251 A | 4/1990 | Payne | |
| 5,026,958 A | 6/1991 | Palacios | |
| D322,402 S | 12/1991 | Budzbanowski | |
| 5,094,355 A | 3/1992 | Clark et al. | |
| 5,152,710 A | 10/1992 | Montgomery | |
| D331,013 S | 11/1992 | Hamamura | |
| 5,190,151 A | 3/1993 | Dietterich | |
| 5,220,999 A | 6/1993 | Goulette | |
| 5,429,833 A | 7/1995 | Wyslotsky | |
| D361,714 S | 8/1995 | Krupa | |
| D363,661 S | 10/1995 | Lambelet, Jr. et al. | |
| 5,497,894 A * | 3/1996 | Krupa et al. | 220/4.23 |
| 5,501,141 A | 3/1996 | Mendez et al. | |
| 5,709,304 A | 1/1998 | Credle, Jr. | |
| 5,897,011 A * | 4/1999 | Brilliant et al. | 220/4.23 |
| 6,003,671 A | 12/1999 | McDonough et al. | |
| 6,162,476 A * | 12/2000 | Shorin | 426/134 |
| 6,176,375 B1 * | 1/2001 | Truscello et al. | 206/776 |
| 6,231,906 B1 * | 5/2001 | Alessi | 426/119 |
| 6,484,732 B1 * | 11/2002 | Simister | 132/309 |
| 6,739,452 B2 * | 5/2004 | Rochelo | 206/454 |
| 6,896,140 B1 * | 5/2005 | Perry | 206/551 |
| 2005/0029258 A1 * | 2/2005 | Juliano et al. | 220/4.23 |

* cited by examiner

CUPCAKE SECUREMENT DEVICE

CROSS REFERENCES TO RELATED APPLICATIONS

This application claims the benefit of U.S. Provisional Application No. 60/478,298 filed on Jun. 13, 2003.

BACKGROUND OF THE INVENTION

1. Field of the Invention

The present invention relates generally to food storage containers and, more particularly, to storage containers for cupcakes.

2. Description of the Prior Art

Disposable or recyclable containers for frosted cupcakes are widely used today by grocery store bakeries and other commercial bakeries. These containers often have a container bottom into which the cupcakes are placed and a container lid which fits over the container bottom and locks to the container bottom in some fashion. These containers are useful for keeping the cupcakes from touching one another from side-to-side as well as keeping the cupcakes sealed from the environment. However, when these containers tip or turn over, the cupcakes move around inside the container, often causing the frosting to stick to the container lid and thereby ruining any design on the frosting. There is, therefore, a need for a cupcake storage container which keeps the cupcakes from moving around inside the storage container, even when the container is tipped or turned over.

In the reusable food storage container market, there are various sizes of containers available. However, there are no known commercially available reusable containers designed specifically for frosted cupcakes. As with the disposable/recyclable container market, it would be useful if a reusable storage container were designed to keep the cupcakes from moving around inside the storage container.

Therefore, the present invention seeks to provide a cupcake storage container which reduces the movement of a stored cupcake inside the container even during movement of the container.

SUMMARY OF THE INVENTION

The present invention is directed to an individual cupcake holder having prongs extending inwardly from the outside shell walls in order to secure a cupcake in place within the cupcake holder, either above the baking liner or anywhere below the lip edge of the cupcake baking liner so that the frosting of the cupcake remains unmarred during transport in lunch boxes and the like. It is also disclosed to include a plurality of prongs that secure a cupcake both above and through the baking liner. Of course, other pastries may be transported in this little container, as well as pieces of fruit and other assorted food items.

We have invented a cupcake storage container that will hold a baked cupcake in such a way that the cupcake will not move within the container, thereby essentially eliminating the possibility of the frosting becoming smeared inside the top of the container if it becomes tipped sideways or upside down. The integrity of the frosting can remain intact. We envision that there will be many applications for such a container including bakeries, school lunch boxes, and fresh baked goods deliveries. Even carrying fresh cupcakes home from the bakery or grocery was previously dangerous for a perfectly decorated cupcake, especially painstakingly decorated cupcakes. The present invention includes numerous designs to ensure safe transport for frosted cupcakes, or it may be used for pastries or any other delicate food product. Even though this patent application is directed toward a cupcake holder, it is envisioned by the present inventors that any food stuff may be transported in the holder.

In accordance with the present invention, a cupcake storage container is disclosed which includes at least a first and a second clamshell half. The clamshells form an interior when connected together, and the interior includes a cup which is sized and shaped to hold a cupcake in a cupcake baking liner. The cup has a bottom, sides extending upwardly from the bottom, and at least one prong extending inwardly from at least one of the sides to secure the cupcake anywhere along its height, whether that be either near the top of the cup or near the bottom, or anywhere in between. The prong is positioned and protrudes inwardly enough such that, when a cupcake in a cupcake baking liner is placed in the cup, the prong may be either below the top of the cupcake baking liner, above the liner, or both simultaneously. In any of these positions, the prong holds the cupcake in a substantially stationary position relative to the container.

Other advantages of the present invention will be readily appreciated as the same becomes better understood after reading the subsequent description taken in conjunction with the appendant drawings.

BRIEF DESCRIPTION OF THE DRAWINGS

For a further understanding of the nature and advantages of the expected scope and various embodiments of the present invention, reference shall be made to the following detailed description, and when taken in conjunction with the accompanying drawings, in which like parts are given the same reference numerals, and wherein.

DETAILED DESCRIPTION OF THE INVENTION

Figure 1:
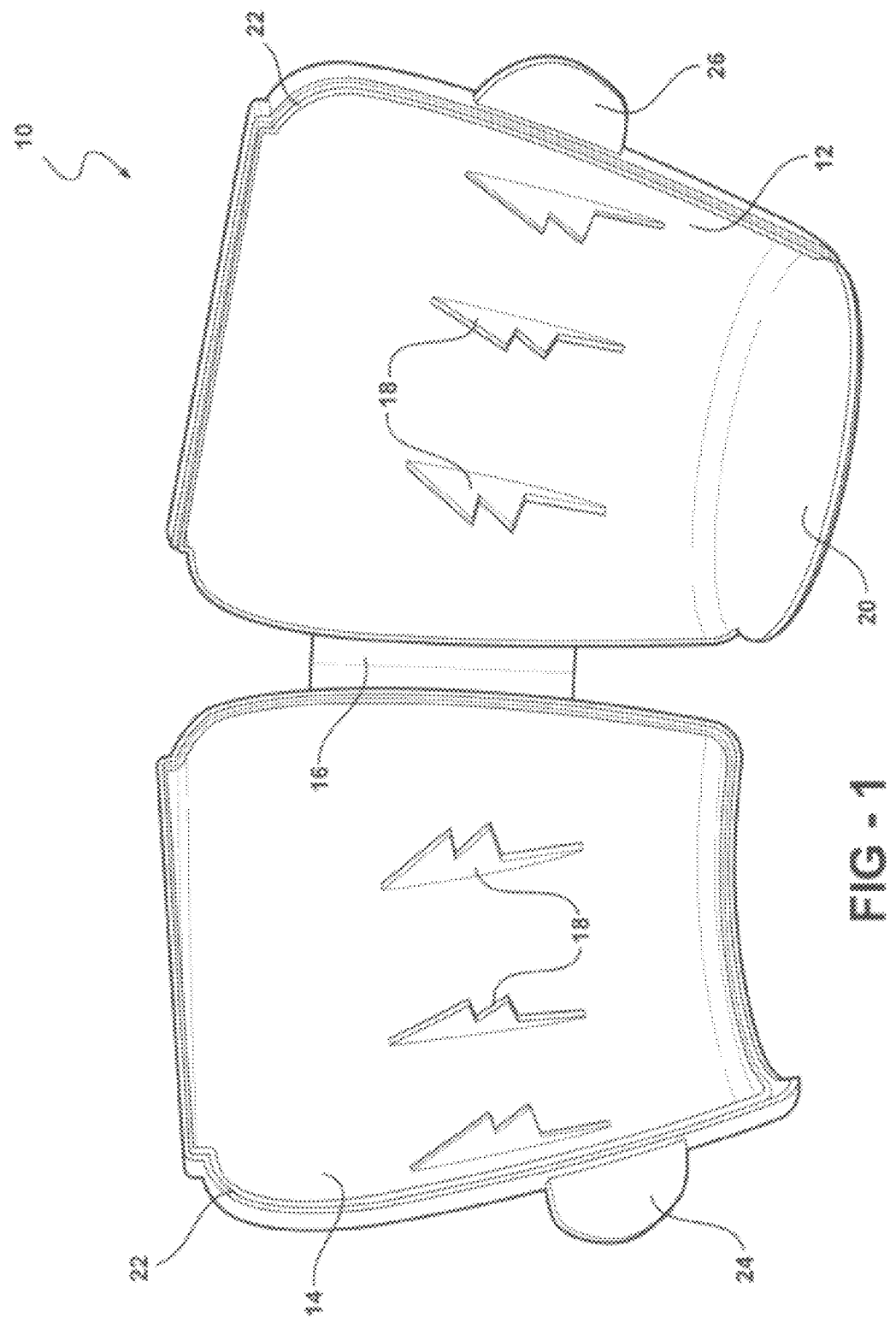
FIG. 1 is a side elevational view of an individual cupcake holder made in accordance with the present invention.

In accordance with the above-mentioned advantages, the present invention is comprised of several embodiments, the first of which is shown in FIG. 1 disclosing a cupcake holder generally denoted by the numeral 10, and including a first cupcake clamshell half 12 and a complementary second cupcake clamshell half 14. A living vertical hinge 16 is shown in this embodiment securing the first and second clamshell halves 12 and 14, respectively, together. Further as shown in this embodiment, prongs 18 extend inwardly from the interior walls of the clamshell halves 12 and 14. The prongs may be situated vertically or horizontally in a manner in which a cupcake baking liner can be held by the prongs, preventing the cupcake from being jostled around inside the cupcake holder 10. In this embodiment, the first cupcake clamshell half 12 includes a floor 20 extending underneath the cupcake. In order to maintain freshness, it is advantageous to employ complementary mating border surfaces 22, wherein the border surfaces 22 include flanges received on the other side.

In closing the cupcake holder, this embodiment employs a lower closure clasp 24 which is in a mating relationship with an upper closure clasp 26 for easy opening and closing of the cupcake holder. Although the pictured lower and upper closure clasps 24 and 26 are of this embodiment, there are many closure-type clasps which are known in the art, and which may be employed advantageously for the present invention. The other closure clasps can be employed without any undue experimentation, and therefore are to be included within the scope of the present invention.

Figure 2:
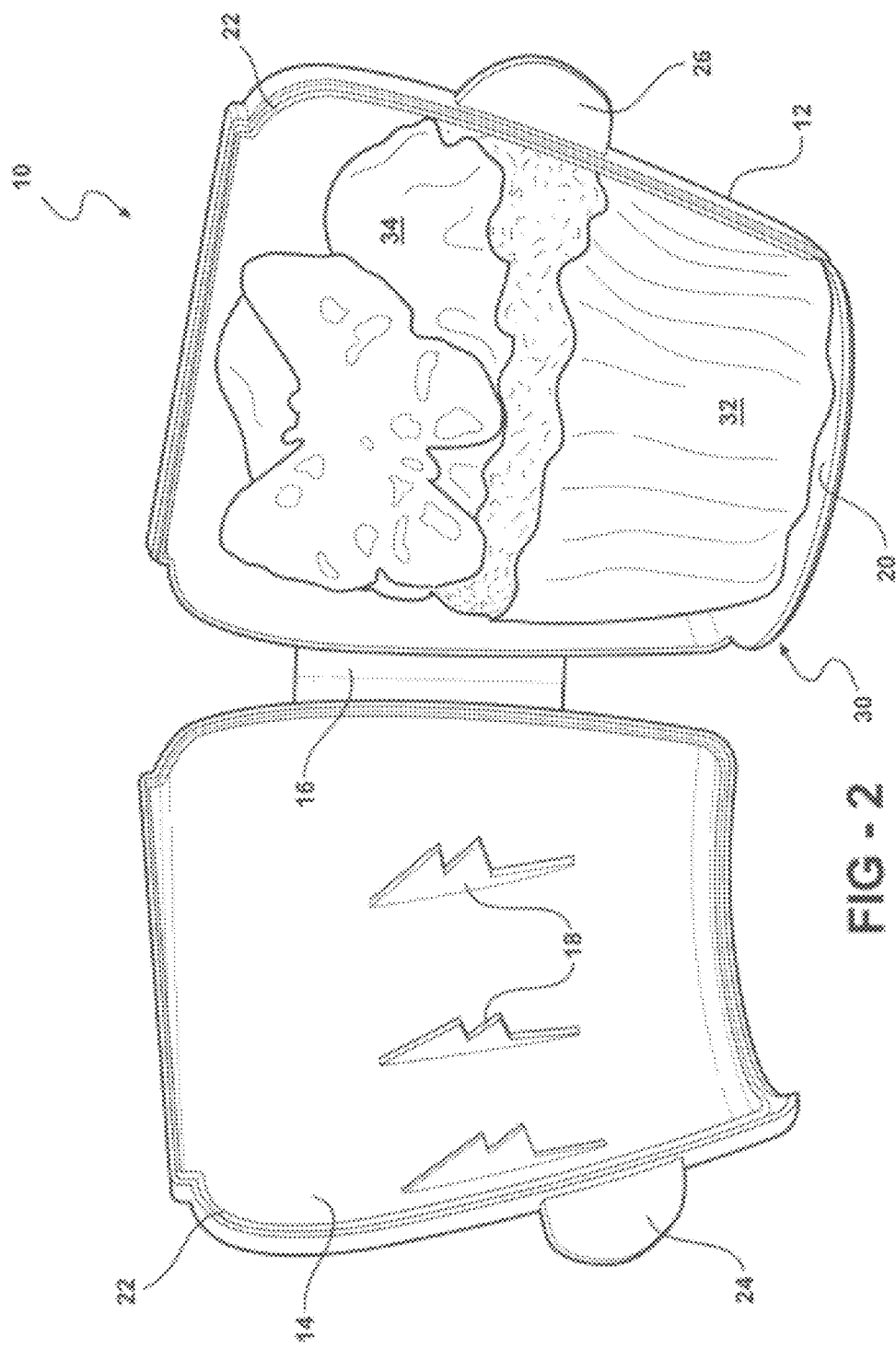
FIG. 2 illustrates a cupcake in a baking liner held in relative placement within a cupcake holder made in accordance with the present invention.

Looking next to FIG. 2, there is shown the embodiment of FIG. 1, but also showing a cupcake generally denoted by the numeral 30 which is found within a paper cupcake baking liner 32. The cupcake 30 is in place within the cupcake holder 10 and prongs 18 can be seen to be in a position horizontally and vertically adapted to press against the cupcake and/or the cupcake baking liner 32 so as to prevent movement therein. This prevents frosting 34 from becoming destroyed during transport. In the process of protecting the cupcake, cupcake 30 is first put into the first cupcake clamshell half 12 and allowed to rest on cupcake holder floor 20. Then, the second cupcake clamshell half 14 is closed over the first cupcake clamshell half 12 and secured via the upper and lower closure clasps 24 and 26. While cupcake 30 is held within cupcake holder 10, the prongs 18 press against the cupcake and/or the paper liner 32 and hold the cupcake 30 in place within the cupcake holder 10.

Figure 3:
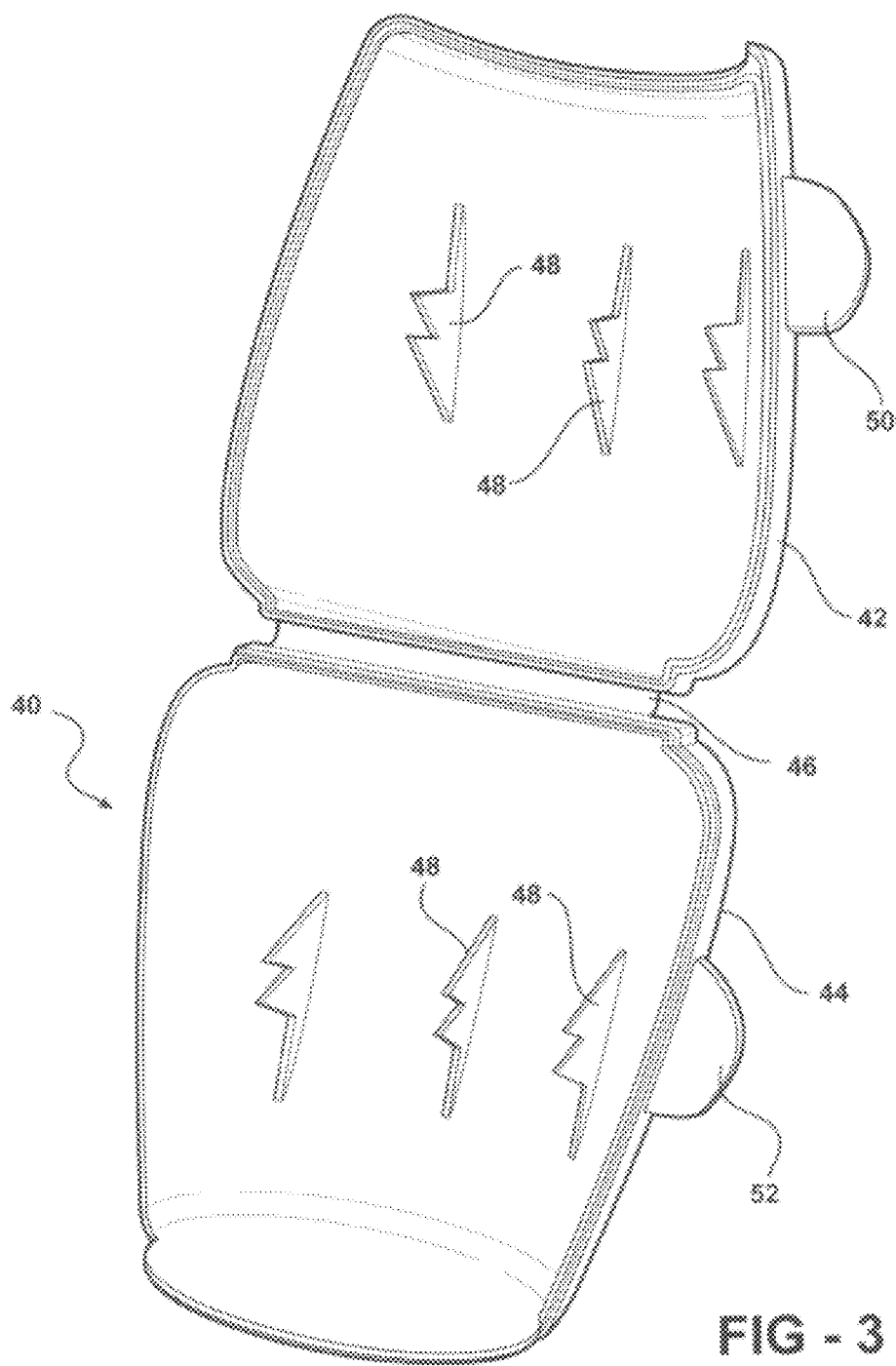
FIG. 3. is a perspective view of yet another embodiment of the present invention.

Looking next to FIG. 3, another embodiment of the present invention is shown, in which a different embodiment of the cupcake holder is generally denoted by the numeral 40 and includes a first cupcake clamshell half 42 in a mating vertical relationship with a second cupcake clamshell half 44. Clamshell halves 42 and 44 include prongs 48 which work similarly to prongs 18 shown in FIGS. 1 and 2. A horizontal living hinge 46 holds together the cupcake clamshell halves 42 and 44 together, and operates to hold the two clamshell halves together once the cupcake has been inserted. Upper and lower closure clasps 50 and 52 hold the cupcake holder together after the cupcake has been inserted into the cupcake holder 40. As mentioned above, any number of prior art closure devices may be utilized for closure.

Needless to say, the living hinge as shown in FIGS. 1, 2 and 3 can be placed on any of the surfaces whether it is on the side as shown in FIGS. 1 and 2 above, the top as in FIG. 3, or the bottom (not shown here), without any undue experimentation. The living hinge may be substituted with any other suitable hinge, or any other closing mechanism known to those in the art. These additional embodiments are within the scope of the invention and are therefore owned by the present inventors.

The preferred embodiment of the present invention discloses a cupcake holder for holding a frosted cupcake in a baking liner which includes at least the following elements: (1) a first cupcake clamshell half having an integral one half of a closure mechanism; (2) a second cupcake clamshell half having another integral mating half of the closure mechanism in a complementary location to the other half; (3) a living hinge integral with and connecting the first and second clamshell halves in a spatial relationship whereby the first clamshell can be closed against the second clamshell half, allowing the two halves of the closure mechanism to come together and secure the cupcake holder in a closed position; and, (4) at least one prong being integral with and extending inwardly from one or both the first and second cupcake clamshell halves, said prong being positioned so that the prongs extend into the cupcake and/or the baking liner for securement within the cupcake holder, whereby a cupcake may be transported without risk of damage to the frosting thereon.

The cupcake holder may further comprise at least two prongs in each of the first and second clamshell halves for more stability when the cupcake is being held. Each of the prongs preferably face inwardly and one of the prongs is preferably positioned such that it will secure the cupcake above the baking liner, while the other prongs will secure the cupcake by extending inwardly into the baking liner. There may be any number of prongs in order to more securely hold the contents in place, although using at least two sets of prongs seem to be most advantageous.

The cupcake holder prongs are sized to press-fit against a cupcake when contained within the cupcake holder, and they may be either cone-shaped bumps, rounded hill-like bumps, or sawtooth shaped prongs. These shapes have been found to be advantageous for securement, although any other prong configuration can work when the prongs are secure in the cupcake to be contained therein.

The various embodiments of the cupcake holders of the present invention may be manufactured of any type of suitable plastic such as polystyrene or polyethylene, rubber, or any other suitable material. These materials may be opaque, clear or translucent, and the material of construction may be colored by pigments or any type of dye. It may be preferred to have the top of the container clear so that the cupcakes or other food articles may be seen. The manufacturing techniques for making the cupcake holders may be any conventional method, including injection molding, blow molding, thermoforming or vacuum molding techniques.

Other embodiments of the present invention may include indentations on the top and bottom of the cupcake holders so that they may be stacked and stored, or so that numerous cupcakes or food items may be easily stored. For example, the cupcake holder as shown in FIG. 1 may include a receiving portion on the top, as may be seen in FIG. 1, and furthermore a downwardly extending portion on the bottom, such that the cupcake holders may be stacked securely.

The foregoing description of a preferred embodiment of the invention has been presented for purposes of illustration and description. It is not intended to be to be exhaustive or to limit the invention to the precise form disclosed. Obvious modifications or variations are possible in light of the above teachings with regards to the specific embodiments. The embodiment was chosen and described in order to best illustrate the principles of the invention and its practical applications to thereby enable one of ordinary skill in the art to best utilize the invention in various embodiments and with various modifications as are suited to the particular use contemplated.

What is claimed is:

1. A cupcake holder for securing a frosted cupcake having frosting thereon in a baking liner so that the frosting remains undisturbed during transport, comprising:
    a first cupcake clamshell half having an integral one half of a closure mechanism, wherein said clamshell half is defined by a top portion sized for accommodating the frosting of the frosted cupcake and a bottom portion adapted for use as a flat cupcake baking liner support, and a side of the clamshell half extending vertically between the top portion and the bottom portion;
    a second cupcake clamshell half having another integral mating half of the closure mechanism in a complementary location to the first half of said clamshell forming an interior when connected together and said interior including a cup sized and shaped to hold a cupcake in a cupcake baking liner, whereby the cup has a bottom and sides extending upwardly from the bottom;
    a vertical hinge integral with and connecting the first and second clamshell halves in a spatial relationship whereby the first clamshell can be closed against the second clamshell half, allowing the two halves of the closure mechanism to come together vertically and secure the cupcake holder in a closed position; and at least one prong being integral with and extending inwardly from both of the sides to secure the cupcake anywhere along its height to preserve the integrity of the frosting on the frosted cupcake, said at least one prong extending inwardly from both of the first and second cupcake clamshell halves, and said prongs being positioned so that the prongs extend into the sides of the cupcake along the height of the cupcake for securement within the cupcake holder, and wherein said prongs are sawtooth-shaped prongs whereby a cupcake may be transported without risk of damage to the frosting thereon and said prongs being sized to press fit against the sides of a cupcake when contained within the cupcake holder, whereby the frosting remains undisturbed.

2. The cupcake holder for holding a frosted cupcake in a baking liner of claim 1, further comprising at least two prongs in both sides of each of the first and second clamshell halves, wherein each of the prongs face inwardly from both sides and the at least two prongs are positioned such that they will secure the cupcake above the baking liner, while another of the at least two prongs will secure the cupcake by extending inwardly into the baking liner.

3. The cupcake holder for holding a frosted cupcake in a baking liner of claim 1, wherein said prongs are located in the proximity of the top of the cupcake to be contained therein, whereby the frosting remains undisturbed.

4. The cupcake holder of claim 1, wherein the hinge includes a living hinge.

5. A cupcake holder for holding a frosted cupcake having frosting thereon in a baking liner, comprising:
a first cupcake clamshell half having an integral one half of a closure mechanism, wherein said clamshell half is defined by a top portion sized for accommodating the frosting of the frosted cupcake and a bottom portion adapted for use as a flat cupcake baking liner support, and a side of the clamshell half extending vertically between the top portion and the bottom portion;
a second cupcake clamshell half having another integral mating half of the closure mechanism in a complementary location to the first half said clamshell forming an interior when connected together and said interior including a cup sized and shaped to hold a cupcake in a cupcake baking liner, whereby the cup has a bottom and sides extending upwardly from the bottom; and
prongs being integral with and extending inwardly from both sides to secure the cupcake anywhere along its height to preserve the integrity of the frosting on the frosted cupcake, said prongs extending inwardly from both of the first and second cupcake clamshell halves, and said prongs being positioned so that the prongs extend into the side of the cupcake along the height of the cupcake for securement within the cupcake holder, and wherein said prongs are sawtooth-shaped prongs, whereby a cupcake may be transported without risk of damage to the frosting thereon and said prongs being sized to press fit against the sides of a cupcake when contained within the cupcake holder, whereby the frosting remains undisturbed.

6. The cupcake holder for holding a frosted cupcake in a baking liner of claim 5, further comprising at least two prongs in both sides of each of the first and second clamshell halves, wherein each of the prongs face inwardly from both sides and the at least two prongs are positioned such that they will secure the cupcake above the baking liner, while another of the at least two prongs will secure the cupcake by extending inwardly into the baking liner.

7. The cupcake holder for holding a frosted cupcake in a baking liner of claim 5, wherein said prongs are located in the proximity of the top of the cupcake to be contained therein, whereby the frosting remains undisturbed.

8. The cupcake holder of claim 5, further comprising a hinge which includes a living hinge.

9. A method of securing a frosted cupcake having frosting thereon, comprising:
providing a frosted cupcake;
providing a cupcake securement device including a first cupcake clamshell half having an integral one half of a closure mechanism, wherein said clamshell half is defined by a top portion sized for accommodating the frosting of the frosted cupcake and a bottom portion adapted for use as a flat cupcake baking liner support, and a side of the clamshell half extending vertically between the top portion and the bottom portion;
providing said cupcake securement device which further includes a second cupcake clamshell half having another integral mating half of the closure mechanism in a complementary location to the first half of said clamshell forming an interior when connected together and said interior including a cup sized and shaped to hold a cupcake in a cupcake baking liner, whereby the cup has a bottom and sides extending upwardly from the bottom;
providing said cupcake securement device which further includes a vertical hinge integral with and connecting the first and second clamshell halves in a spatial relationship whereby the first clamshell can be closed against the second clamshell half, allowing the two halves of the closure mechanism to come together vertically and secure the cupcake holder in a closed position; and
providing said cupcake securement device which further includes at least one prong being integral with and extending inwardly from both sides to secure the cupcake anywhere along its height to preserve the integrity of the frosting on the frosted cupcake, said at least one prong extending inwardly from both the first and second cupcake clamshell halves, and said at least one prong being positioned so that the prongs extend into the side of the cupcake along the height of the cupcake for securement within the cupcake holder, and wherein said prongs are sawtooth-shaped prongs whereby a cupcake may be transported without risk of damage to the frosting thereon; and
placing said frosted cupcake inside the cupcake securement device; and
closing the first cupcake clamshell half against the second cupcake clamshell half utilizing the integral closure mechanism, whereby the cupcake is secured therein by the prongs extending inwardly from both sides to preserve the integrity of the frosting on the frosted cupcake.

10. The method of claim 9, wherein the step of providing said frosted cupcake securement device is accomplished by providing at least two prongs in both sides of each of the first and second clamshell halves, wherein each of the prongs face inwardly from both sides and one of the at least two prongs is positioned such that it will secure the cupcake above the baking liner, while another of the at least two prongs will secure the cupcake by extending inwardly into the baking liner.

* * * * *